US010730149B2

(12) United States Patent
Desikan et al.

(10) Patent No.: US 10,730,149 B2
(45) Date of Patent: Aug. 4, 2020

(54) BRAZING SHEET AND PRODUCTION METHOD

(71) Applicant: GRÄNGES AB, Stockholm (SE)

(72) Inventors: Sampath Desikan, London (GB); Ma Weizeng, Shanghai (CN)

(73) Assignee: Gränges AB, Stockholm (SE)

(*) Notice: Subject to any disclaimer, the term of this patent is extended or adjusted under 35 U.S.C. 154(b) by 227 days.

(21) Appl. No.: 15/775,428

(22) PCT Filed: Nov. 9, 2016

(86) PCT No.: PCT/EP2016/077057
§ 371 (c)(1),
(2) Date: May 11, 2018

(87) PCT Pub. No.: WO2017/081042
PCT Pub. Date: May 18, 2017

(65) Prior Publication Data
US 2018/0333809 A1   Nov. 22, 2018

(30) Foreign Application Priority Data

Nov. 13, 2015  (WO) ................ PCT/CN2015/094596
Jan. 18, 2016  (WO) ................ PCT/CN2016/071207

(51) Int. Cl.
| | |
|---|---|
| *B23K 35/00* | (2006.01) |
| *B23K 35/28* | (2006.01) |
| *B23K 1/00* | (2006.01) |
| *B32B 15/01* | (2006.01) |
| *F28F 21/08* | (2006.01) |
| *C22C 21/02* | (2006.01) |
| *C22C 21/10* | (2006.01) |
| *C22C 21/00* | (2006.01) |
| *C22F 1/04* | (2006.01) |
| *B23K 35/02* | (2006.01) |
| *C22C 21/04* | (2006.01) |
| *C22F 1/043* | (2006.01) |
| *C22F 1/053* | (2006.01) |
| *B21B 3/00* | (2006.01) |
| *B23K 101/14* | (2006.01) |

(52) U.S. Cl.
CPC .............. *B23K 35/288* (2013.01); *B21B 3/00* (2013.01); *B23K 1/0012* (2013.01); *B23K 35/0238* (2013.01); *B23K 35/286* (2013.01); *B32B 15/016* (2013.01); *C22C 21/00* (2013.01); *C22C 21/02* (2013.01); *C22C 21/04* (2013.01); *C22C 21/10* (2013.01); *C22F 1/04* (2013.01); *C22F 1/043* (2013.01); *C22F 1/053* (2013.01); *F28F 21/084* (2013.01); *F28F 21/089* (2013.01); *B21B 2003/001* (2013.01); *B23K 2101/14* (2018.08); *Y10T 428/12764* (2015.01)

(58) Field of Classification Search
CPC ................................. B23K 35/288; B23K 1/0012; B23K 2101/14; B23K 35/286; B23K 35/0238; B23K 1/0014; B23K 2101/02; B23K 35/002; B23K 35/004; B23K 35/0233; B23K 35/044; C22F 1/04; C22F 1/053; C22F 1/043; C22C 21/00; C22C 21/04; C22C 21/10; C22C 21/02; B21B 3/00; B21B 2003/001; F28F 21/089; F28F 21/084; B32B 15/016; Y10T 428/12764
USPC ............................. 228/183, 245–255, 56.3
See application file for complete search history.

(56) References Cited

U.S. PATENT DOCUMENTS

| | | | | |
|---|---|---|---|---|
| 4,317,484 | A * | 3/1982 | Tanabe ................ | F28F 19/004 165/134.1 |
| 5,375,760 | A * | 12/1994 | Doko .................... | C22F 1/04 148/528 |
| 5,744,255 | A * | 4/1998 | Doko .................... | B23K 35/286 428/654 |
| 6,387,540 | B1 * | 5/2002 | Yoshidomi ............ | B32B 15/016 138/140 |

(Continued)

FOREIGN PATENT DOCUMENTS

| | | |
|---|---|---|
| CN | 1473084 A | 2/2004 |
| CN | 1826220 A | 8/2006 |

(Continued)

OTHER PUBLICATIONS

First Office Action issued in corresponding Chinese Patent Application No. 201680066346.9, dated Nov. 4, 2019.

(Continued)

*Primary Examiner* — Kiley S Stoner
(74) *Attorney, Agent, or Firm* — Morgan, Lewis & Bockius LLP

(57) ABSTRACT

Brazing sheet having a core layer made of a first aluminium alloy, attached to one side of said core layer a sacrificial cladding made of a second aluminium alloy, and attached to the other side of said core layer a braze cladding made of a third aluminium alloy. The first aluminium alloy consists of: Si ≤0.6 wt %; Fe ≤0.7 wt %; Cu 0.4-0.9 wt %; Mn 1.0-1.6 wt %; Mg ≤0.2 wt %; Cr 0.05-0.15 wt %; Zr 0.05-0.15 wt %; Ti 0.05-0.15 wt %; other elements ≤0.05 wt % each and ≤0.2 wt % total; Al balance up to 100 wt %; the second aluminium alloy consists of: Si 0.65-1.0 wt %; Fe ≤0.4 wt %; Cu ≤0.05 wt %; Mn 1.4-1.8 wt %; Zn 1.5-4.0 wt %; Zr 0.05-0.20 wt %; other elements ≤0.05 wt % each and ≤0.2 wt % total; Al balance up to 100 wt %. The third aluminium alloy has a melting point lower than said first and second aluminium alloys.

19 Claims, No Drawings

(56) References Cited

U.S. PATENT DOCUMENTS

| | | | | |
|---|---|---|---|---|
| 7,407,714 | B2* | 8/2008 | Haller | B23K 35/286 148/437 |
| 7,514,155 | B2* | 4/2009 | Benedictus | B23K 35/0238 148/523 |
| 7,648,776 | B2* | 1/2010 | Vieregge | B23K 35/0238 228/262.51 |
| 8,413,876 | B2* | 4/2013 | Dulac | B23K 1/0012 228/219 |
| 8,932,728 | B2 | 1/2015 | Matsumoto et al. | |
| 9,033,206 | B2* | 5/2015 | Edo | B23K 1/19 228/183 |
| 9,976,200 | B2* | 5/2018 | Ando | B23K 1/00 |
| 9,976,201 | B2* | 5/2018 | Ando | B21B 1/22 |
| 10,099,320 | B2* | 10/2018 | Kamiya | B23K 1/19 |
| 10,300,563 | B2* | 5/2019 | Itoh | B23K 1/19 |
| 10,384,312 | B2* | 8/2019 | Ishigami | B23K 35/0238 |
| 10,478,925 | B2* | 11/2019 | Izumi | B23K 35/22 |
| 10,518,363 | B2* | 12/2019 | Yoshino | F28F 19/06 |
| 2009/0020276 | A1* | 1/2009 | Ueda | B23K 35/0233 165/177 |
| 2009/0020585 | A1* | 1/2009 | Fukumoto | B23K 35/0233 228/56.3 |
| 2009/0165901 | A1* | 7/2009 | Koshigoe | B32B 15/016 148/535 |
| 2010/0147500 | A1* | 6/2010 | Minami | B23K 1/0012 165/173 |
| 2010/0291400 | A1 | 11/2010 | Ahl et al. | |
| 2011/0287277 | A1 | 11/2011 | Kimura et al. | |
| 2012/0129003 | A1 | 5/2012 | Ando et al. | |
| 2013/0221077 | A1* | 8/2013 | Kanda | B23K 1/0012 228/219 |
| 2013/0244051 | A1* | 9/2013 | Matsumoto | B23K 35/0238 428/576 |
| 2014/0144613 | A1* | 5/2014 | Sakashita | B23K 1/0012 165/185 |
| 2016/0223264 | A9* | 8/2016 | Desikan | F28D 1/0366 |
| 2016/0298914 | A1* | 10/2016 | Kanno | B23K 1/00 |
| 2017/0115076 | A1* | 4/2017 | Sakashita | C22C 21/00 |
| 2017/0173740 | A1* | 6/2017 | Kimura | B23K 35/286 |
| 2017/0232561 | A1* | 8/2017 | Kimura | C22C 21/10 228/56.3 |
| 2018/0326540 | A1 | 11/2018 | Desikan et al. | |

FOREIGN PATENT DOCUMENTS

| | | | | |
|---|---|---|---|---|
| CN | 101124451 | A | 2/2008 | |
| CN | 101186009 | A | 5/2008 | |
| CN | 102431237 | A | 5/2012 | |
| EP | 1666190 | A1 | 6/2006 | |
| EP | 2130934 | A1 | 12/2009 | |
| EP | 2253726 | A2 | 11/2010 | |
| EP | 2418042 | A1 | 2/2012 | |
| EP | 2431121 | A2 | 3/2012 | |
| EP | 2479303 | A1 * | 7/2012 | ......... F28D 1/05366 |
| JP | 2000087162 | A * | 3/2000 | ........... B32B 15/016 |
| JP | 2000087163 | A * | 3/2000 | ........... B32B 15/016 |
| JP | 2003-268470 | A | 9/2003 | |
| JP | 2005-232506 | A | 9/2005 | |
| JP | 2007-216283 | A | 8/2007 | |
| JP | 2008-127607 | A | 6/2008 | |
| KR | 20070061410 | A * | 6/2007 | ........... C22C 19/056 |
| KR | 20070061413 | A * | 6/2007 | ........... B23K 35/286 |
| WO | 02/38321 | A1 | 5/2002 | |
| WO | 2005/014274 | A1 | 2/2005 | |
| WO | 2006/087823 | A1 | 8/2006 | |
| WO | 2007/042206 | A1 | 4/2007 | |
| WO | 2007/131727 | A1 | 11/2007 | |
| WO | WO-2009156607 | A1 * | 12/2009 | ......... B23K 35/0238 |
| WO | 2010/132018 | A1 | 11/2010 | |

OTHER PUBLICATIONS

International Search Report and Written Opinion dated Jan. 27, 2017, issued in corresponding International Patent Application No. PCT/EP2016/077057.

* cited by examiner

BRAZING SHEET AND PRODUCTION METHOD

The present invention relates to an aluminium alloy brazing sheet with excellent corrosion performance also at thin gauge and a process for its production. The invention further relates to use of the brazing sheet for the manufacturing of a brazed heat exchanger and a brazed heat exchanger made from the brazing sheet.

Brazed aluminium heat exchangers such as radiators, condensers, evaporators etc. are commonly used in automotive engine cooling or air conditioning systems as well as in industrial cooling systems. They usually include of a number of parallel tubes (welded/folded/multi chamber etc) with each tube joined typically at either end to headers. Corrugated fins brazed to the tubes separate any two adjacent tubes and transfer heat between the tube walls to a gaseous medium outside the tubes, such as ambient air.

In order to save weight, the trend goes towards thinner gauge materials, which increases the demand for resistance against corrosion, particularly for the tubes.

The prior art discloses use of a sacrificial cladding of a less noble aluminium alloy on the inside of the tubes. Such a cladding usually contains Zn in order to lower the corrosion potential (i.e. rendering it more negative). Examples of disclosures of these kind of materials include WO2007/042206 A1, WO2010/132018 A1, EP2418042 A1, EP1666190 A1, EP2130934 A1, JP2003268470 A, JP2005232506 A, JP2007216283 A, JP2008127607 A, U.S. Pat. No. 8,932,728 B2 and US2011/0287277 A1.

It is generally considered that if the Zn content in the sacrificial cladding is too low, e.g. below 1.4 wt %, the protection against inside corrosion will be insufficient, in particular in cases of thinner gauge tube stocks. However, if the Zn content is high, it has been found that Zn during brazing may migrate into the core and decrease the resistance against external corrosion attacks.

US2010/0291400 A1 recognises the negative effect on the external corrosion resistance caused by back diffusion of Zn from the sacrificial cladding through the core alloy and discloses a brazing sheet material having a sacrificial cladding with Zn content of less than 1.4 wt %.

The problem of Zn diffusion can also be dealt with by including a further layer between the core and the sacrificial cladding, but such brazing sheets are more complicated to produce.

It is an object of the invention to provide a brazing sheet suitable for thin gauge tubes in brazed heat exchangers that after brazing have excellent resistance against corrosion from both sides, but still being comparatively simple to produce.

It is a further object of the invention to provide a brazing sheet comprising a core layer and a sacrificial cladding attached directly to one side of the core layer and a braze cladding attached directly to the other side of the core layer.

It has been found that these objects can be achieved by a brazing sheet comprising a core layer made of a first aluminium alloy, attached to one side of said core layer a sacrificial cladding made of a second aluminium alloy, attached to the other side of said core layer a braze cladding made of a third aluminium alloy, wherein said first aluminium alloy consists of:

Si ≤0.6 wt %; Fe ≤0.7 wt %; Cu 0.4-0.9 wt %; Mn 1.0-1.6 wt %; Mg ≤0.2 wt %; Cr 0.05-0.15 wt %; Zr 0.05-0.15 wt %; Ti 0.05-0.15 wt %; other elements ≤0.05 wt % each and ≤0.2 wt % in total; Al balance up to 100 wt %;

said second aluminium alloy consists of: Si 0.65-1.0 wt %; Fe ≤0.4 wt %; Cu ≤0.05 wt %; Mn 1.4-1.8 wt %; Zn 1.5-4.0 wt %; Zr 0.05-0.20 wt %; other elements ≤0.05 wt % each and ≤0.2 wt % in total; Al balance up to 100 wt %; and, said third aluminium alloy has a melting point lower than said first and second aluminium alloys. Particularly, the liquidus temperature of the third aluminium alloy is lower than the solidus temperatures of the first and of the second aluminium alloys.

Other elements refer to any elements present as impurities. Such elements are difficult to avoid due to impurities in the raw materials used for making the alloys, particularly when significant amounts of recycled scrap is used as is the normal practice in full scale production. Such elements may, for example, include impurities of one or more of V, Ni, Sr, etc.

For any description of alloy compositions or preferred alloy compositions, all references to percentages are by weight percent (wt %) unless otherwise indicated.

The term "sheet" as used herein also include coiled strips.

Properties after brazing refer to properties of the brazing sheet, or any article made by shaping the brazing sheet, after it has been brazed at a temperature of 600° C. for 3 minutes.

The brazing sheet of the invention is particularly suitable as a tube stock material with the sacrificial cladding forming the inside of the tubes made from the brazing sheet. Preferably there is no braze cladding on top of the sacrificial cladding. The brazing sheet is preferably a three layer material with no further layers in addition to the core, the sacrificial cladding and the braze cladding. The total thickness of the brazing sheet is preferably from 0.15 to 0.6 mm, more preferably from 0.15 to 0.25 mm and most preferably from 0.18 to 0.22 mm. Preferably the sacrificial cladding constitutes from 3 to 20%, more preferably from 4 to 15% and most preferably from 5 to 12% of the total thickness of the brazing sheet. Preferably the braze cladding constitutes from 3 to 20%, most preferably from 5 to 15% of the total thickness of the brazing sheet.

It has been found that the special combination of the composition of the core alloy (i.e. the first aluminium alloy) and the composition of the sacrificial cladding alloy (i.e. the second aluminium alloy), after brazing, provides for high resistance against corrosion attacks from both sides of a tube made from the brazing sheet. Particularly, high resistance against corrosion from the outside of the tubes (i.e. the side of the braze cladding) is obtained even if diffusion of Zn from the sacrificial cladding has taken place during brazing. Thus, even for thin gauge materials, such as of a thickness from 0.15 to 0.25 mm, and with high Zn content in the sacrificial cladding, e.g. from 2 to 3 wt %, it possible to obtain more than 25 days, preferably more than 40 days SWAAT resistance (ASTM G85-A3) after brazing.

After brazing, the core layer preferably comprises Cr containing intermetallic particles, in particular intermetallic particles also containing Mn and Si. Preferably the contents of Si and Mn in the core alloy are set so a sacrificial "brown band" is formed during brazing. The brown band is an area comprising Mn and Si containing particles formed by penetration of Si from the braze cladding and resulting in depletion of Mn in solid solution, which gives anodic protection of the inner part of the core against corrosion from the side of the braze cladding, i.e. from the outside of a tube formed from the brazing sheet. According to the invention, the brown band formed after brazing preferably comprises intermetallic particles containing Cr, particularly intermetallic particles containing Al, Mn, Si and Cr. Such particles preferably have an average mean equivalent diameter in the range from 50 to 500 nm, most preferably from 60 to 260 nm.

Before brazing, the brazing sheet has good formability so that different designs of brazed and/or folded tubes can be made, such as B-type or multi-port tubes.

The core alloy comprises ≤0.6 wt %, preferably ≤0.2 wt % of Si. Keeping the Si content low facilitates the formation of a "brown band" as discussed above.

The core alloy comprises ≤0.7 wt %, preferably 0.1-0.6 wt % of Fe. The presence of small amounts of Fe cannot be avoided in practice since it is usually included as an impurity in the raw materials. Too high content of Fe leads to deterioration of the pitting corrosion resistance after brazing.

The core alloy comprises 0.4-0.9 wt %, preferably 0.5-0.8 wt % of Cu. The presence of Cu increases the strength. However, too high content of Cu increases the sensitivity to hot cracking during casting, lowers the solidus temperature and may also increase the susceptibility of the materials to intergranular corrosion after brazing.

The core alloy comprises 1.0-1.6 wt %, preferably 1.1-1.5 wt % of Mn. The presence of Mn in the core increases the strength both when in solid solution and when present in particles. At a sufficiently high Mn content in the core, a large number of particles can be precipitated during preheating and subsequent hot rolling during production of the brazing sheet, and after brazing a substantial potential gradient between the core and sacrificial cladding can be obtained because of the large difference of Mn in solid solution. Too high content of Mn may lead to large eutectic particles being formed during casting, which is undesirable in the manufacture of thin material.

The core alloy comprises ≤0.2 wt %, preferably ≤0.15 wt % of Mg, e.g. 0.05-0.15 wt % of Mg. The presence of magnesium improves the strength of the material, but at too high amounts the brazeability is worsened, particularly when using flux at controlled atmosphere brazing (CAB), such as in the Nocoloc™ method.

The core alloy comprises 0.05-0.15 wt %, preferably 0.06-0.13 wt % of Cr. It has been found that Cr is included in intermetallic particles, particularly in the brown band after brazing, and significantly improves the resistance against corrosion from the outside of the tubes (i.e. the side of the braze cladding), in spite of migration of Zn into the core during brazing. Too high amount of Cr leads to undesirable giant primary intermetallic particles adversely affecting the hot rolling behaviour of the materials.

The core alloy comprises 0.05-0.15 wt %, preferably 0.06-0.13 of Zr. The presence of of Zr causes an increased number of very fine particles, promoting development of relatively large elongated grains after brazing, which is beneficial for the corrosion resistance. Too high content of Zr leads to giant intermetallic particle formation during casting and thereby loss of the beneficial role of Zr.

The core alloy comprises 0.05-0.15 wt %, preferably 0.06-0.12 of Ti. The presence of Ti improves the corrosion resistance by promoting layer-by-layer corrosion. Too high content of Ti leads to giant intermetallic particle formation during casting, rendering the role of Ti ineffective.

The sacrificial cladding (i.e. the second aluminium alloy) comprises 1.5-5 wt % or 1.5-4 wt %, preferably 2-3 wt %, most preferably 2.5-3 wt % of Zn. If the content of Zn is too low the sacrificial cladding will not provide sufficient protection of the core against corrosion from the inside of tubes. Too high content of Zn decreases the melting point and can potentially also make the material more brittle and cause problems during rolling.

The sacrificial cladding comprises 0.65-1.0 wt %. The presence of Si improves the strength of the cladding material by reacting with Mn. If the Si content is too low the number of AlMnSi dispersoids formed is insufficient for improving the strength to a desired level. Too high content of Si is undesired as it lowers the melting point of the cladding.

The sacrificial cladding comprises ≤0.4 wt %, preferably ≤0.3 wt % of Fe. The presence of small amounts of Fe cannot be avoided in practice since it is usually included as an impurity in the raw materials. Too high content of Fe leads to worsening of corrosion resistance of the sacrificial cladding material.

The sacrificial cladding comprises ≤0.05 wt % of Cu. The acceptable content of Cu must be low to avoid extensive pitting of the sacrificial cladding material.

The sacrificial cladding comprises 1.4-1.8 wt % of Mn. The presence of Mn improves the strength of the cladding material, as well as the resistance to erosion corrosion after brazing. At too low content of Mn sufficient amount of Mn for particle induced strengthening cannot be obtained and the number of particles for improved erosion corrosion resistance will be too low. At too high content of Mn the workability of the cladding material is deteriorated and too large intermetallic particles may be formed and negatively affect the fatigue properties.

The sacrificial cladding comprises 0.05-0.20 wt % of Zr. The presence of Zr in the sacrificial cladding serve the same purpose as in the core.

The composition of the braze cladding (i.e. the third alloy) is not critical as long as the melting point is within the desired range, preferably from 550 to 615° C. Preferably the braze cladding is an aluminium alloy comprising 4-15 wt %, most preferably 6-13 wt % of Si. Small amount of other elements may optionally be present, such as Bi for improving the wetting and Zn for adjusting the corrosion potential, as well as unavoidable impurities. A typical braze cladding may, for example, consist of 4-15 w% Si, ≤0.5 wt % of Bi, ≤0.25 wt % of Cu, ≤0.1 wt % of Mn, ≤0.2 wt % of Ti, ≤0.8 wt % of Fe, ≤0.05 wt % each and ≤0.2 wt % in total of other elements, and balance Al.

The compositions of the alloys are set so the sacrificial cladding is less noble than the core. The compositions are preferably adjusted so the corrosion potential after brazing (measured according to ASTM G69) of the core alloy is 30-150 mV higher than for the sacrificial cladding.

Preferred temper in the delivery condition is strain hardened tempers such as H14 or H24.

Tubes made from brazing sheets of the invention can be used in any brazed heat exchanger. Examples of such heat exchangers for automotive include radiators, air condition evaporators and condensers, cabin heaters, charge air coolers, oil coolers and battery coolers. Other examples include heat exchangers for the corresponding functions in stationary heating and cooling devices.

The invention also concerns a process for the production of a brazing sheet as described above. The process comprises the steps of:

providing a core ingot of a first alloy as earlier described;

cladding the core ingot on one side with a second alloy (intended to form the sacrificial cladding) as earlier described;

cladding the core ingot on the other side with a third alloy (intended to form the braze cladding) as earlier described;

preheating the cladded ingot at a temperature from 400 to 575° C., preferably from 450 to 550° C. during 1 to 25 hours;

hot rolling the preheated cladded ingot to obtain a sheet, preferably of a thickness from 3 to 10 mm;

cold rolling the sheet obtained at the hot rolling to the final thickness, preferably from 0.15 to 0.25 mm; and, optionally annealing the cold rolled sheet at a temperature from 200 to 300° C. during 1 to 10 hours to the desired delivery temper, such as H24.

The ingots can be provided by any suitable casting method, preferably DC casting. The degree of thickness reduction at hot rolling is preferably from 95 to 99%. The degree of thickness reduction at cold rolling is preferably from 90 to 98%. The cold rolling to final thickness may be performed in one or several stages, optionally with intermediate annealing.

For the compositions of the alloys and details of the final product the above description of the brazing sheet is referred to.

The invention further concerns the use of a brazing sheet of the invention for the manufacturing of a brazed heat exchanger.

The invention finally concerns a brazed heat exchanger made by forming tubes from a brazing sheet of the invention, assembling said tubes with fins and other parts of the heat exchanger followed by brazing to joining the parts.

The invention is further illustrated through the following Examples which, however, not are intended to limit the scope of the invention.

EXAMPLE

A 0.20 mm gauge tube stock material according to the invention (referred to as Material A) was produced in the following process route: (a) DC casting a core alloy ingot of the composition in wt.%: 0.04% Si, 0.23% Fe, 0.68% Cu; 1.27% Mn, 0.07% Mg, 0.09% Cr, 0.09% Zr, 0.1% Ti, balance Al and unavoidable impurities; (b) cladding the core on one side with a braze alloy of the composition 7.8% Si, 0.21% Fe, 0.02% Mn balance Al and unavoidable impurities; (c) cladding the core one the other side with a sacrificial alloy of the composition, in wt %, 0.73% Si, 0.26% Fe, 0.04% Cu, 1.58% Mn, 2.47% Zn, 0.13 Zr, 0.03% Ti, balance Al and unavoidable impurities; (d) preheating the resulting sandwich assembly to a temperature of 500° C. for 15 hours prior to hot rolling; (e) hot rolling to a thickness of 3.8 mm; (f) cold rolling to the final thickness of 0.20 mm; and, (f) final partial annealing at 250° C. for 3 hours to H24 temper. Of the total thickness the braze cladding constituted 10% and the sacrificial cladding 5%.

As a comparison, a 0.20 mm gauge tube stock material (referred to as Material B) was made with the same process route, but with different alloy compositions. The core alloy had the composition, in wt %, 0.03% Si, 0.22% Fe, 0.61% Cu; 1.68% Mn, 0.05% Mg, 0.13% Zr, 0.03% Ti, balance Al and unavoidable impurities; the braze alloy had the composition, in wt %, 7.9% Si, 0.18% Fe, balance Al and unavoidable impurities; the sacrificial alloy had the composition, in wt %, 0.81% Si, 0.26% Fe, 0.03% Cu, 1.59% Mn, 2.46% Zn, 0.12% Zr, 0.03% Ti, balance Al and unavoidable impurities. Further, the braze cladding constituted 7% of the total thickness. The main difference from Material A is the core alloy composition. The slight differences in the compositions of the other alloys are due to inevitable variations in the production of the alloys and do not change the properties of the final material. Further, the difference in the thickness of the braze cladding, do not change the corrosion properties of the materials after brazing.

6 coupon samples from each material produced were brazed at 600° C. /3 minutes in a Nocolok furnace and tested in SWAAT chamber (ASTM G85-A3). Results of the tests as measured by the time to first perforation are shown below:

|  | Coup. 1 (days) | Coup. 2 (days) | Coup. 3 (days) | Coup. 4 (days) | Coup. 5 (days) | Coup. 6 (days) |
| --- | --- | --- | --- | --- | --- | --- |
| Material A (invention) | 56-60 | 63-67 | 63-67 | 56-60 | 63-67 | 56-60 |
| Material B (comparison) | 8 | 8 | 9 | 9 | 11 | 11 |

The invention claimed is:

1. A brazing sheet comprising a core layer made of a first aluminium alloy, attached to one side of said core layer a sacrificial cladding made of a second aluminium alloy, attached to the other side of said core layer a braze cladding made of a third aluminium alloy,
    wherein said first aluminium alloy consists of:
        Si ≤0.2 wt %
        Fe ≤0.7 wt %
        Cu 0.4-0.9 wt %
        Mn 1.0-1.6 wt %
        Mg ≤0.2 wt %
        Cr 0.05-0.15 wt %
        Zr 0.05-0.15 wt %
        Ti 0.05-0.15 wt %
        Other elements ≤0.05 wt % each and ≤0.2 wt % in total
        Al balance up to 100 wt %;
    said second aluminium alloy consists of:
        Si 0.65-1.0 wt %
        Fe ≤0.4 wt %
        Cu ≤0.05 wt %
        Mn 1.4-1.8 wt %
        Zn 1.5-5.5 wt %
        Zr 0.05-0.20 wt %
        Other elements ≤0.05 wt % each and ≤0.2 wt % in total
        Al balance up to 100 wt %; and,
    said third aluminium alloy has a melting point lower than said first and second aluminium alloys.

2. Brazing sheet as claimed in claim 1, wherein the second alloy comprises 2-3 wt % of Zn.

3. Brazing sheet as claimed in claim 1, wherein the third alloy is an aluminium alloy comprising 4-15 wt % of Si.

4. Brazing sheet as claimed in claim 1, wherein the thickness of the brazing sheet is from 0.15 to 0.25 mm.

5. Brazing sheet as claimed in claim 1, wherein the thickness of the brazing sheet is from 0.18 to 0.22 mm.

6. Brazing sheet as claimed in claim 1, wherein contents of Si and Mn in the first alloy are set so a sacrificial brown band is formed during brazing, said brown band formed comprising intermetallic particles containing Cr.

7. Brazing sheet as claimed in claim 6, wherein said brown band comprises intermetallic particles containing Al, Mn, Si and Cr.

8. Brazing sheet as claimed in claim 1, wherein the intermetallic particles have an average mean equivalent diameter in the range from 50 to 500 nm.

9. Brazing sheet as claimed in claim 1, having a SWAAT resistance, after brazing, against corrosion from the side of the braze cladding is more than 25 days.

10. Brazing sheet as claimed in claim 1, wherein the brazing sheet is a three layer material with no further layers in addition to the core, the sacrificial cladding and the braze cladding.

11. Brazing sheet as claimed in claim 1, wherein the thickness of the sacrificial cladding constitutes from 3 to 20% of the total thickness of the brazing sheet.

12. A process for the production of a brazing sheet according to claim 1, comprising the steps of:
- providing a core ingot of a first alloy as defined in claim 1;
- cladding the core ingot on one side with a second alloy as defined in claim 1;
- cladding the core ingot on the other side with a third alloy as defined in claim 1;
- preheating the cladded ingot at a temperature from 400 to 575° C. during 1 to 25 hours;
- hot rolling the preheated cladded ingot to obtain a sheet; and,
- cold rolling the sheet obtained at the hot rolling to the final thickness.

13. A brazed heat exchanger made by forming tubes from a brazing sheet according to claim 1, assembling said tubes with fins and other parts of the heat exchanger followed by brazing.

14. Brazing sheet as claimed in claim 1, wherein the third aluminium alloy has a liquidus temperature lower than the solidus temperatures of the first and second aluminium alloys.

15. Brazing sheet as claimed in claim 1, wherein said third aluminium alloy consists of:
- Si 4-15wt %
- Bi ≤0.5 wt %
- Cu ≤0.25 wt %
- Mn ≤0.1 wt %
- Ti ≤0.2 wt %
- Fe ≤0.8 wt %
- Other elements ≤0.05 wt % each and ≤0.2 wt % in total
- Al balance up to 100 wt %.

16. A brazing sheet comprising a core layer made of a first aluminium alloy, attached to one side of said core layer a sacrificial cladding made of a second aluminium alloy, attached to the other side of said core layer a braze cladding made of a third aluminium alloy,
wherein the first aluminium alloy consists of:
- Si 0.04-0.2 wt %
- Fe 0.1-0.6 wt %
- Cu 0.4-0.9 wt %
- Mn 1.0-1.6 wt %
- Mg 0.05-0.15 wt %
- Cr 0.06-0.13 wt %
- Zr 0.06-0.13 wt %
- Ti 0.06-0.12 wt %
- Other elements 0.05 wt % each and wt % in total
- Al balance up to 100 wt %, wherein the second aluminium alloy consists of:
- Si 0.65-1.0 wt %
- Fe ≤0.4 wt %
- Cu ≤0.05 wt %
- Mn 1.4-1.8 wt %
- Zn 1.5-5.5 wt %
- Zr 0.05-0.20 wt %
- Other elements ≤0.05 wt % each and ≤0.2 wt % in total
- Al balance up to 100 wt %, wherein the third aluminium alloy comprises 4-15 wt % of Si,
wherein the third aluminium alloy has a melting point lower than said first and second aluminium alloys, and
wherein a total thickness of the brazing sheet is from 0.15 to 0.6 mm.

17. Brazing sheet as claimed in claim 16, wherein a thickness of the sacrificial cladding constitutes from 3 to 20% of the total thickness of the brazing sheet and wherein a thickness of the braze cladding constitutes from 3 to 20% of the total thickness of the brazing sheet.

18. Brazing sheet as claimed in claim 16, wherein a thickness of the sacrificial cladding constitutes from 5 to 12% of the total thickness of the brazing sheet and wherein a thickness of the braze cladding constitutes from 5 to 15% of the total thickness of the brazing sheet.

19. Brazing sheet as claimed in claim 16, wherein the total thickness of the brazing sheet is from 0.15 to 0.25 mm, and wherein a content of Zn in the second aluminium alloy is 2-3 wt %.

\* \* \* \* \*